United States Patent
Porter et al.

(10) Patent No.: US 7,181,444 B2
(45) Date of Patent: Feb. 20, 2007

(54) SYSTEM AND PROCESS FOR SEARCHING A NETWORK

(75) Inventors: Charles A. Porter, Seattle, WA (US); Jonathan David Reichhold, Seattle, WA (US); Eric Carl Rehm, Bainbridge Island, WA (US)

(73) Assignee: America Online, Inc., Dulles, VA (US)

( * ) Notice: Subject to any disclaimer, the term of this patent is extended or adjusted under 35 U.S.C. 154(b) by 615 days.

(21) Appl. No.: 10/432,306

(22) PCT Filed: Nov. 20, 2001

(86) PCT No.: PCT/US01/43247

§ 371 (c)(1),
(2), (4) Date: May 21, 2003

(87) PCT Pub. No.: WO02/42925

PCT Pub. Date: May 30, 2002

(65) Prior Publication Data

US 2004/0030682 A1      Feb. 12, 2004

Related U.S. Application Data

(60) Provisional application No. 60/252,273, filed on Nov. 21, 2000.

(51) Int. Cl.
 *G06F 17/30* (2006.01)
(52) U.S. Cl. ............................................. 707/3; 707/10
(58) Field of Classification Search ................ 707/3–6, 707/10
See application file for complete search history.

(56) References Cited

U.S. PATENT DOCUMENTS

| | | | |
|---|---|---|---|
| 5,241,305 A | 8/1993 | Fascenda et al. | 340/825.44 |
| 5,345,227 A | 9/1994 | Fascenda et al. | 340/825.22 |
| 5,483,522 A | 1/1996 | Derby et al. | 370/54 |
| 5,907,837 A | 5/1999 | Ferrel et al. | 707/3 |
| 5,917,424 A | 6/1999 | Goldman et al. | 340/825.44 |
| 5,918,232 A | 6/1999 | Pouschine et al. | 707/103 |
| 5,920,854 A | 7/1999 | Kirsch et al. | 707/3 |

(Continued)

OTHER PUBLICATIONS

Podlipnig et al., "A Survey of Web Cache Replacement Strategies," ACM Computing Surveys, vol. 35, No. 4, Dec. 2003, pp. 374-398.

(Continued)

*Primary Examiner*—Joon Hwan Hwang
(74) *Attorney, Agent, or Firm*—Perkins Coie LLP

(57) ABSTRACT

A system for searching a network for network based content related to a search query, such as multimedia and streaming media, includes an adapter for formatting the search query, a first database containing previous search results and a second database for storing currently returnable metadata, a search processor, and at least one search engine kernel comprising a search engine inherent database. The search engine coordinates searching of the first database and the second database, and and provides the formatted search query to the search engine kernel. The search processor also provides and receives search results to and from the first database and the second database, and provides search results to the adapter. The system stores a predetermined amount of previous search results in the first database, such that search results for a current search are retrieved from the database, avoiding a search through search engine kernel, comprising searchable metadata.

19 Claims, 4 Drawing Sheets

U.S. PATENT DOCUMENTS

| | | | |
|---|---|---|---|
| 5,920,856 A | 7/1999 | Syeda-Mahmood | 707/3 |
| 5,941,944 A | 8/1999 | Messerly | 709/203 |
| 5,953,718 A | 9/1999 | Wical | 707/5 |
| 5,963,940 A | 10/1999 | Liddy et al. | 707/7 |
| 5,974,409 A * | 10/1999 | Sanu et al. | 707/3 |
| 5,991,756 A | 11/1999 | Wu | 707/3 |
| 5,991,809 A | 11/1999 | Kriegsman | 709/226 |
| 6,009,271 A | 12/1999 | Whatley | 395/705 |
| 6,026,391 A | 2/2000 | Osborn et al. | 707/2 |
| 6,112,203 A | 8/2000 | Bharat et al. | 707/5 |
| 6,138,113 A | 10/2000 | Dean et al. | 707/2 |
| 6,151,584 A | 11/2000 | Papierniak et al. | 705/10 |
| 6,175,830 B1 | 1/2001 | Maynard | 707/5 |
| 6,389,467 B1 | 5/2002 | Eyal | 709/223 |
| 6,421,675 B1 * | 7/2002 | Ryan et al. | 707/100 |
| 6,484,199 B2 | 11/2002 | Eyal | 709/223 |
| 6,519,648 B1 | 2/2003 | Eyal | 709/231 |
| 6,539,382 B1 * | 3/2003 | Byrne et al. | 707/10 |
| 6,931,397 B1 * | 8/2005 | Sundaresan | 707/5 |
| 6,981,002 B2 * | 12/2005 | Nunez | 707/104.1 |

OTHER PUBLICATIONS

Eric Rehm, *Representing Internet Streaming Media Metadata Using MPEG-7 Multimedia Description Schemes*, Jul. 2, 2000, pp. 1-14.

Network Working Group, *Dublin Core Metadata for Resource Discovery*, Sep. 1998, pp. 1-10.

Taalee Semantic Engine Brochure.

Eberman et al., Compaq, *Indexing Mulitmedia for the Internet*, Cambridge Research Laboratory, Mar. 1999.

Kontothanassis et al. Compaq, *Design, Implementation, and Analysis of a Multimedia Indexing and Delivery Server*, Cambridge Research Laboratory, Aug. 1999.

John R. Smith & Shih-Fu Chang, *Visually Searching the Web for Content*, Jul.-Sep. 1997, pp. 12-20.

Anne J. Gilliland-Swetland, *Introduction to Metadata: Setting the Stage*, Jul. 5, 2000, pp. 1-12.

Max Chittister, *Oracle interMedia Annotator User's Guide*, Release 1.5, Jan. 2000, Beta Draft.

* cited by examiner

SYSTEM AND PROCESS FOR SEARCHING A NETWORK

CROSS REFERENCE TO RELATED APPLICATIONS

This application claims the benefit under 35 U.S.C. § 365 of International Application PCT/US01/43247 filed Nov. 20, 2001, which claims the benefit of the U.S. Provisional application No. 60/252,273 filed Nov. 21, 2000.

TECHNICAL FIELD

The field of this invention relates generally to computer related information search and retrieval, and more specifically to a robust system and process for searching for network-based content.

BACKGROUND

As background to understanding the invention, an aspect of the Internet (also referred to as the World Wide Web, or Web) contributing to its popularity is the plethora of multimedia and streaming media files available to users. However, finding a specific multimedia or streaming media file buried among the millions of files on the Web is often an extremely difficult task. The volume and variety of informational content available on the web is likely to continue to increase at a rather substantial pace. This growth, combined with the highly decentralized nature of the web, creates substantial difficulty in locating particular informational content.

Streaming media refers to audio, video, multimedia, textual, and interactive data files that are delivered to a user's computer via the Internet or other network environment and begin to play on the user's computer before delivery of the entire file is completed. One advantage of streaming media is that streaming media files begin to play before the entire file is downloaded, saving users the long wait typically associated with downloading the entire file. Digitally recorded music, movies, trailers, news reports, radio broadcasts and live events have all contributed to an increase in streaming content on the Web. In addition, less expensive high-bandwidth connections such as cable, DSL and T1 are providing Internet users with speedier, more reliable access to streaming media content from news organizations, Hollywood studios, independent producers, record labels and even home users.

A user typically searches for specific information on the Internet via a search engine. A search engine comprises a set of programs accessible at a network site within a network, for example a local area network (LAN) or the Internet and World Wide Web. One program, called a "robot" or "spider", pre-traverses a network in search of documents (e.g., web pages) and other programs, and builds large index files of keywords found in the documents. Typically, a user formulates a query comprising one or more search terms and submits the query to another program of the search engine. In response, the search engine inspects its own index files and displays a list of documents that match the search query, typically as hyperlinks. The user may then activate one of the hyperlinks to see the information contained in the document.

Conventional search engines, however, have drawbacks. For example, many typical search engines are oriented to discover textual information only. In particular, they are not well suited for indexing information contained in structured databases (e.g. relational databases), voice related information, audio related information, multimedia, and streaming media, etc. Also, mixing data from incompatible data sources is difficult for conventional search engines.

Furthermore, many conventional search engine systems are neither robust enough nor scalable enough to provide a user with search results, and update its databases quickly, regardless of the search query. Many search engine systems comprise software elements that reside on specific processors, wherein the software elements are not portable. That is, the software elements cannot be downloaded to another processor in accordance with demand. Also, many of the software elements are vendor specific, wherein the search engine system cannot accommodate software providing similar functionality by another vendor. In the case where software elements may be installed on several processors concurrently to process large amounts of data, many systems are not scalable, in that the number of processors utilized cannot be increased or decreased in accordance with demand. Thus, there is a need for a search system that is not limited by the previously described drawbacks and disadvantages.

SUMMARY

The invention describes a system for searching a network for network-based content related to a search query includes an adapter for formatting a search query. The system also includes a first database comprising previous search results and a second database for storing current search results. Also included are at least one search engine for searching search engine inherent databases for content related to the search query, and a search processor. The search processor coordinates searching of the first database and said at least one search engine, and provides the formatted search query to said at least one search engine. The search processor also provides and receives search results to and from the first database and the second database, and provides search results to the adapter.

A method for searching a network for network based content related to a search query, includes receiving the search query, formatting the search query, and searching a database for the network based content related to the search query. The database comprises previous search results. If no network based content related to the search query is found in the database, the formatted search query is provided to at least one search engine. Search results are retrieved from the database or the at least one search engine and the retrieved search results are formatted.

DETAILED DESCRIPTION

Figure 1:
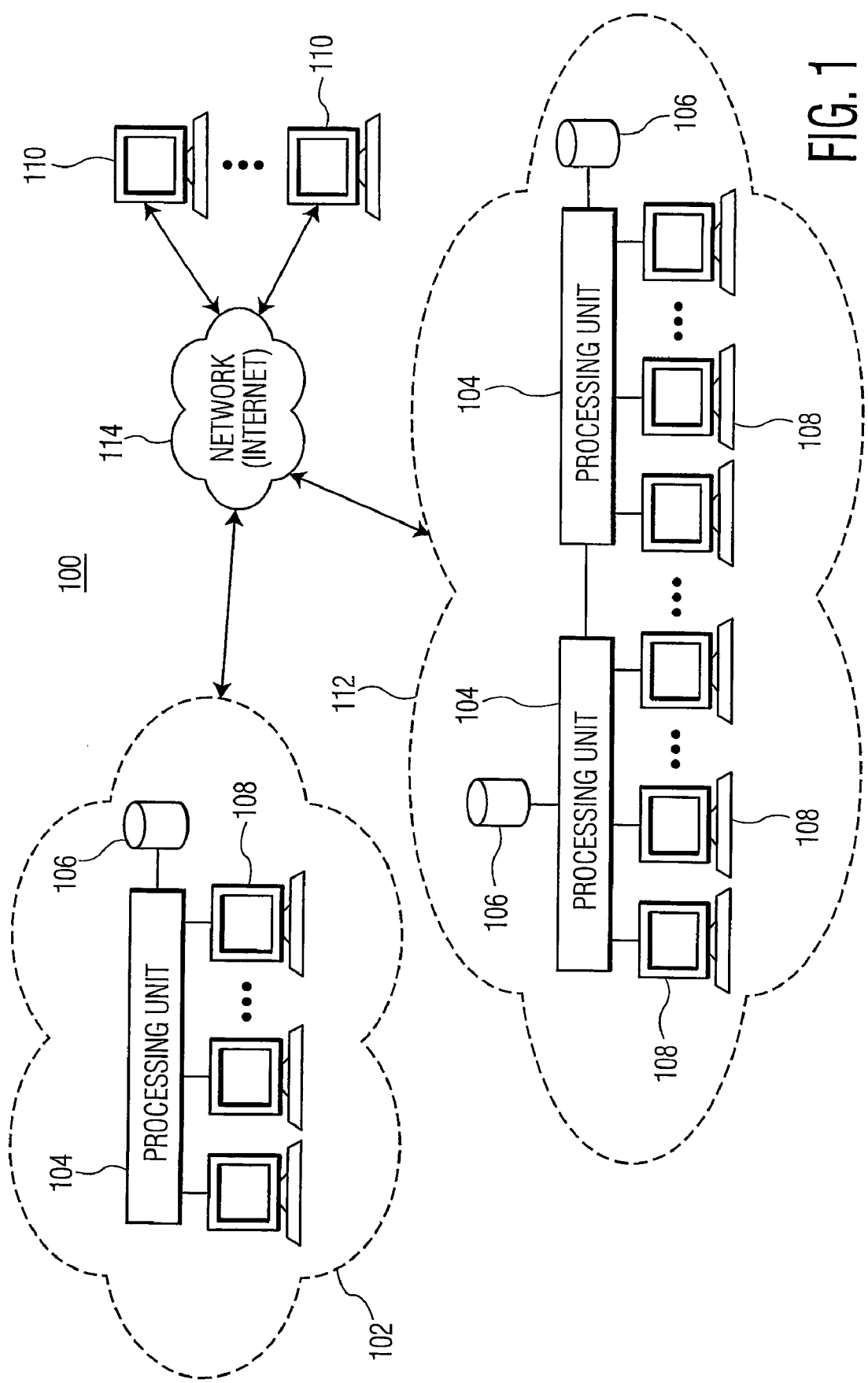
FIG. 1 is a stylized overview illustration of a system of interconnected computer system networks.

The Internet is a worldwide system of computer networks, that is a network of networks in which users at one computer can obtain information from any other computer and communicate with users of other computers. The most widely used part of the Internet is the World Wide Web (often-abbreviated "WWW" or called "the Web"). An outstanding feature of the Web is its use of hypertext, which is a method of cross-referencing. In most Web sites, certain words or phrases appear in text of a different color than the surrounding text. This text is often also underlined. Sometimes, there are buttons, images or portions of images that are "clickable." Using the Web provides access to millions of pages of information. Web "surfing" is done with a Web browser; such as NETSCAPE NAVIGATOR® and MICROSOFT INTERNET EXPLORER®. The appearance of a particular website may vary slightly depending on the particular browser used. Recent versions of browsers have "plug-ins," which provide animation, virtual reality, sound and music.

The present invention is a system and method for retrieving network-based content, including media files and data related to media files, on a computer network via a search system utilizing metadata. As used herein, the term "media file" includes audio, video, textual, multimedia data files, and streaming media files. Multimedia files comprise any combination of text, image, video, and audio data. Streaming media comprises audio, video, multimedia, textual, and interactive data files that are delivered to a user's computer via the Internet or other communications network environment and begin to play on the user's computer/device before delivery of the entire file is completed. One advantage of streaming media is that streaming media files begin to play before the entire file is downloaded, saving users the long wait typically associated with downloading the entire file. Digitally recorded music, movies, trailers, news reports, radio broadcasts and live events have all contributed to an increase in streaming content on the Web. In addition, the reduction in cost of communications networks through the use of high-bandwidth connections such as cable, DSL, T1 lines and wireless networks (e.g., 2.5G or 3G based cellular networks) are providing Internet users with speedier, more reliable access to streaming media content from news organizations, Hollywood studios, independent producers, record labels and even home users themselves.

Examples of streaming media include songs, political speeches, news broadcasts, movie trailers, live broadcasts, radio broadcasts, financial conference calls, live concerts, web-cam footage, and other special events. Streaming media is encoded in various formats including REALAUDIO®, REALVIDEO®, REALMEDIA®, APPLE QUICKTIME®, MICROSOFT WINDOWS® MEDIA FORMAT, QUICKTIME®, MPEG-2 LAYER III AUDIO, and MP3®. Typically, media files are designated with extensions (suffixes) indicating compatibility with specific formats. For example, media files (e.g., audio and video files) ending in one of the extensions, ram, .rm, .rpm, are compatible with the REALMEDIA® format. Some examples of file extensions and their compatible formats are listed in the following table. A more exhaustive list of media types, extensions and compatible formats may be found at http://www.bowers.cc/extensions2.htm.

TABLE 1

| Format | Extension |
|---|---|
| REALMEDIA ® | .ram, .rm, .rpm |
| APPLE QUICKTIME ® | .mov, .qif |
| MICROSOFT WINDOWS ® MEDIA PLAYER | .wma, .cmr, .avi |

TABLE 1-continued

| Format | Extension |
|---|---|
| MACROMEDIA FLASH | .swf, .swl |
| MPEG | .mpg, .mpa, .mp1, .mp2 |
| MPEG-2 LAYER III Audio | .mp3, .m3a, .m3u |

Metadata as descriptive data literally means "data about data." Metadata is data that comprises information that describes the contents or attributes of other data (e.g., media file). For example, a document entitled, "Dublin Core Metadata for Resource Discovery," (http://www.ietf.org/rfc/rfc2413.txt) separates metadata into three groups, which roughly indicate the class or scope of information contained therein. These three groups are: (1) elements related primarily to the content of the resource, (2) elements related primarily to the resource when viewed as intellectual property, and (3) elements related primarily to the instantiation of the resource. Examples of metadata falling into these groups are shown in the following table.

TABLE 2

| Content | Intellectual Property | Instantiation |
|---|---|---|
| Title | Creator | Date |
| Subject | Publisher | Format |
| Description | Contributor | Identifier |
| Type | Rights | Language |
| Source | | |
| Relation | | |
| Coverage | | |

Sources of metadata include web page content, uniform resource locators (URLs), media files, and transport streams used to transmit media files. Web page content includes HTML, XML, metatags, and any other text on the web page. As explained in more detail, herein, metadata may also be obtained from the URLs the web page, media files, and other metadata. Metadata within the media file may include information contained in the media file, such as in a header or trailer, of a multimedia or streaming file, for example. Metadata may also be obtained from the media/metadata transport stream, such as TCP/IP (e.g., packets), ATM, frame relay, cellular based transport schemes (e.g., cellular based telephone schemes), MPEG transport, HDTV broadcast, and wireless based transport, for example. Metadata may also be transmitted in a stream in parallel or as part of the stream used to transmit a media file (a High Definition television broadcast is transmitted on one stream and metadata, in the form of an electronic programming guide, is transmitted on a second stream).

Referring to FIG. 1 there is shown a stylized overview of a system 100 of interconnected computer system networks 102 and 112. Each computer system network 102 and 112 contains at least one corresponding local computer processor unit 104 (e.g., server), which is coupled to at least one corresponding local data storage unit 106 (e.g., database), and local network users 108. A computer system network, as a communications network, may be a local area network (LAN) 102 or a wide area network (WAN) 112, for example. The local computer processor units 104 are selectively coupled to a plurality of media devices 110 through the network (e.g., Internet) 114. Each of the plurality of local computer processors 104, the network user processors 108, and/or the media devices 110 may have various devices connected to its local computer systems, such as scanners, bar code readers, printers, and other interface devices. A local computer processor 104, network user processor 108, and/or media device 110, programmed with a Web browser, locates and selects (e.g., by clicking with a mouse) a particular Web page, the content of which is located on the local data storage unit 106 of a computer system network 102, 112, in order to access the content of the Web page. The Web page may contain links to other computer systems and other Web pages.

The local computer processor 104, the network user processor 108, and/or the media device 110 may be a computer terminal, a pager which can communicate through the Internet using the Internet Protocol (IP), a Kiosk with Internet access, a connected electronic planner (e.g., a PALM device manufactured by Palm, Inc.) or other device capable of interactive communication through a network, such as an electronic personal planner. The local computer processor 104, the network user processor 108, and/or the media device 110 may also be a wireless device, such as a hand held unit (e.g., cellular telephone) that connects to and communicates through the Internet using the wireless access protocol (WAP). Networks 102 and 112 may be connected to the network 114 by a modem connection, a Local Area Network (LAN), cable modem, digital subscriber line (DSL), twisted pair, wireless based interface (cellular, infrared, radio waves), or equivalent connection utilizing data signals. Databases 106 may be connected to the local computer processor units 104 by any means known in the art. Databases 106 may take the form of any appropriate type of memory (e.g., magnetic, optical, etc.). Databases 106 may be external memory or located within the local computer processor 104, the network user processor 108, and/or the media device 110.

Computers may also encompass computers embedded within consumer products and other computers. For example, an embodiment of the present invention may comprise computers (as a processor) embedded within a television, a set top box, an audio/video receiver, a CD player, a VCR, a DVD player, a multimedia enable device (e.g., telephone), and an Internet enabled device.

In an exemplary embodiment of the invention, the network user processors 108 and/or media devices 110 include one or more program modules and one or more databases that allow the user processors 108 and/or media devices 110 to communicate with the local processor 104, and each other, over the network 114. The program module(s) include program code, written in PERL, Extensible Markup Language (XML), Java, Hypertext Mark-up Language (HTML), or any other equivalent language which allows the network user processors 108 to access the program module(s) of the local processors 104 through the browser programs stored on the network user processors 108.

Web sites and web pages are locations on a network, such as the Internet, where information (content) resides. A web site may comprise a single or several web pages. A web page is identified by a Uniform Resource Identifier (URI) comprising the location (address) of the web page on the network. Web sites, and web pages, may be located on local area network 102, wide area network 112, network 114, processing units (e.g., servers) 104, user processors 108, and/or media devices 110. Information, or content, may be stored in any storage device, such as a hard drive, compact disc, and mainframe device, for example. Content may be stored in various formats, which may differ, from web site to web site, and even from web page to web page.

Figure 2:
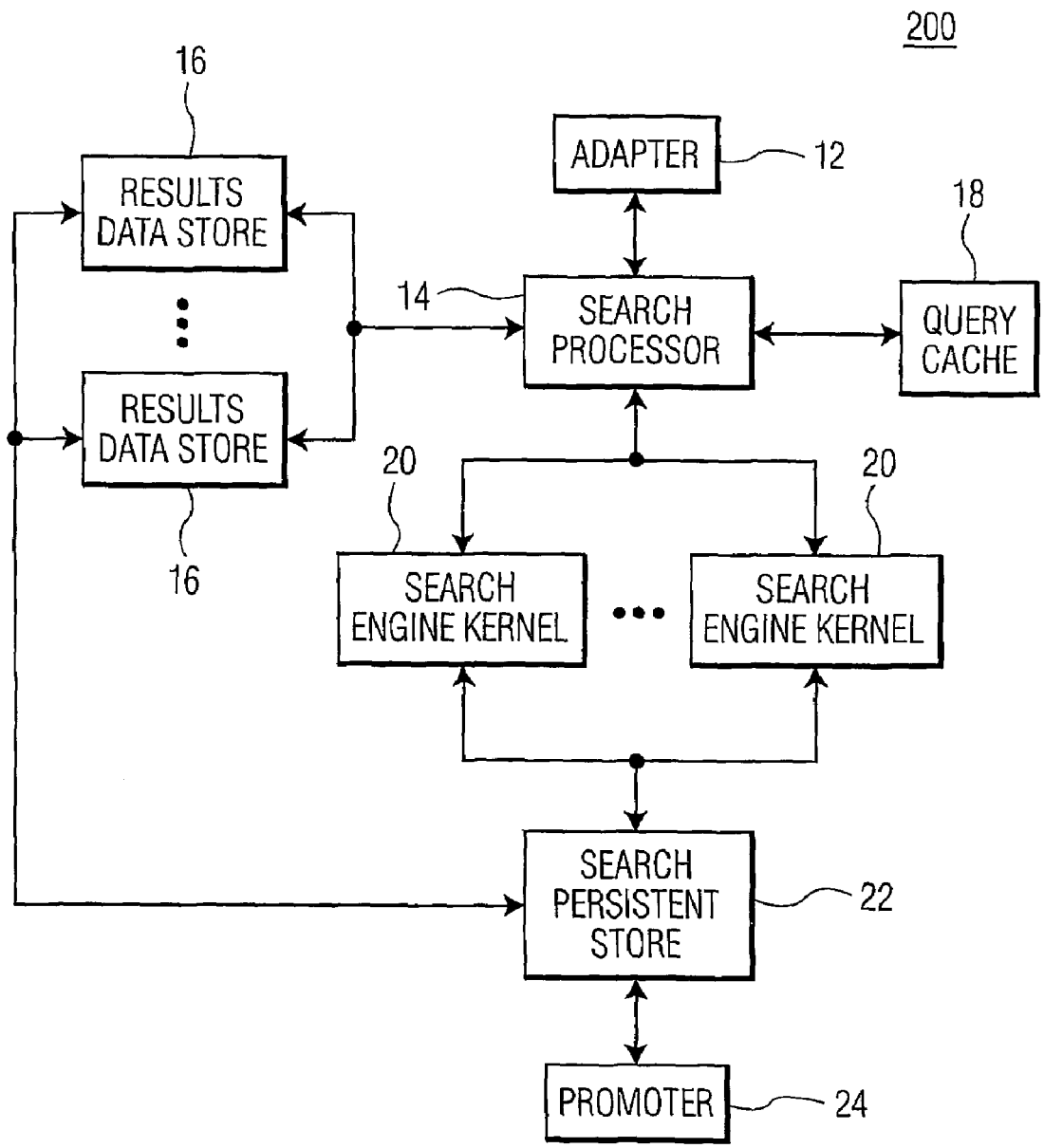
FIG. 2 is a functional block diagram of a search system in accordance with the present invention.

FIG. 2 is a functional block diagram 200 of a robust system for searching a network in accordance with the present invention. System 200 comprises several functional elements including an adapter 12, a search processor 14, data stores for search results 16, a query cache 18, search engine kernels 20, search persistent store 22, and promoter 24. In one embodiment of the invention, each of the functional elements of system 200 is implemented on a plurality of processors, which may be dynamically modified in accordance with the demand being placed on the system 200. For example, each functional element in system 200 may reside on a separate processing unit, wherein additional processing units are brought on line to help process any particular function and deactivated when the demand decreases. In another exemplary embodiment, all functional elements of system 200 reside on a single processing unit, wherein software code segments and memory are associated with each functional element. The amount of the single processor unit's resources available for a particular functional element is dynamic, and allocated according to the demand placed on the single processing unit for a particular function.

System 200 comprises the characteristics of separability (severability) and scalability. Separability refers to the functional elements of system 200 be completely portable, and replaceable. That is each functional element may reside on any processing unit and any functional element may be replaced by an updated version, or another vendor's version, of the functional element. Separability is ensured by implementing inter-element specific interface protocols. The inter-element interfaces, referred to as application programming interfaces (APIs), allow functional elements to communicate with each other, regardless of the version or vendor of the functional element. APIs are known in the art. An API is a set of predetermined, re-usable protocols. For example, to create a API for searching an interface is provided with a method search with a set of defined parameters (e.g., a query string, a string of desired bit rates, a string of desired systems), which all systems must honor to conform to the API.

Scalability refers to the system 200 being capable of reallocating system resources to meet specific functional element demand. For example, system 200 increases or decreases memory available to a specific functional element, such as query cache 18, in accordance with the amount of memory needed by that functional element. Thus, if query cache 18 requires more memory, system 200 makes more memory available to query cache 18. As data is removed from query cache 18, the unused memory is made available to other functional elements of the system 200. Currently reallocation requires restarting one of the said components after modifying configuration settings.

Adapter 12 is a functional element for translating and formatting search queries into a system format usable by system 200. Adapter 12 translates a query, such as a user submitted search query, from a standard protocol, such as hypertext transfer protocol (HTTP) into a system 200 specific format, such as extensible markup language (XML) in accordance with the schemes required by the search engine kernels 20. Specific search engines often require data to be provided in that search engine's specific format of XML. Thus, adapter 12 translates and formats search queries to each search engines specific format. Adapter 12 also formats the search results from the system format to the submitted format or requested formats, such as hypertext markup language (HMTL) and XML.

HTTP is the protocol most commonly used by processors on the Internet to communicate with each other. An HTTP transaction typically comprises a request sent by one processor to another processor, and a response returned. HTTP requests and responses include a message header, describing the message. XML is a language, which describes network (e.g., Internet) data and its structure, in contrast to HTML, which describes how data should be presented. XML provides a user the ability to create her own vocabulary to describe information. With this ability, an XML document can be designed to fit specific purposes, which is not possible with HTML. Thus, it is not uncommon for many search engines to create search engine specific XML code for provided data.

Search processor 14 is a functional element for coordinating the searching process performed by the system 200. Search processor 14 ensures that a search query is properly translated to the system format and that search results are translated into the proper format (e.g., user-provided format, user-specified format). Search processor 14 also ensures that queries are searched for in the appropriate database.

Query cache 18 is a functional element comprising copies of search-engine results, such as data identifiers and scores related to and/or from a number of previous searches, although the query cache 18 may accommodate other forms of data related to prior searches. Query cache 18 may comprise any processor, code segment, storage device, database, or a combination thereof capable of storing search results and communicating the same with the search processor 14 As search queries are provided to the system 200, results of the searches based upon these queries are stored in the query cache 18. If the search results for the present search query are stored in the query cache 18, the search results are retrieved by search processor 14 directly from query cache 18, without accessing the search engine kernel 20. The record identifiers returned from query cache 18 or search engine kernel 20 are then combined with the displayable data from the results data store 16. These combined results are then provided to the user or requesting system via adapter 12. Search results stored in query cache 18 are updated in accordance with a process called LRU (least recently used). In accordance with the LRU process, the most recent search results replace the search results that have resided in query cache 18 the longest. That is, the most recent search results replace the oldest search results. Thus, the amount of memory (size) contained in the query cache 18 remains approximately constant, within limits. However, the size of query cache 18 may be increased or decreased in accordance with the demand placed on query cache 18. In one embodiment, the size is configurable as a startup parameter and changing the size of the cache requires rebooting the query cache (18) only. The system recognizes that the query cache has restarted and carries on normally. Furthermore, search results stored in the query cache 18 are deleted (i.e., removed from query cache 18) if they are not accessed or replaced within a predetermined amount of time. For example, in order to provide timely results for items such as news, the items are "aged out" after approximately 30 minutes. However, this parameter is configurable, and may be set to any desired value.

Query cache 18, in an alternative embodiment, supports results paging. The result from a query typically includes all the hits corresponding to a search query. In this embodiment, search processor 14, when retrieving data from the query cache 18, only receives a subset of data necessary to satisfy a request for a currently requested page of data (corresponding to a first displayed page, for example), formatted by adapter 12. An additional subset of data (corresponding to a second displayed page, for example) is sent from query cache 18, when search processor 14 requests an additional page of search results formatted by adapter 12. For instance, immediately after a query is run, only the first page of search results is returned to adapter 12 for formatting. If a user wished to see a second page, the same query is passed through the system again, but the search request is only for the rows of data corresponding to a second displayed page.

Search engine kernels 20 are functional elements for providing the search mechanism, wherein databases are searched for the search query and search query related data. The databases, searched by the search engine kernels 20, comprise content resulting from agents, such as spiders and robots, searching a network (e.g., the Internet). The search engine kernel 20 may be any appropriate search engine kernel known in the art. Examples of search engine kernels include Oracle™- iMT™, AltaVista™, and InfoSeek™. The severability of system 200 through the use of APIs allows any search engine kernel to be modified to a newer version, replaced with another vendor's version, replaced with a different search engine kernel, or a combination thereof, without disabling system 200. Thus system 200 is not dependent upon one specific type of search engine kernel. Although system 200 is depicted in FIG. 2 as comprising a plurality of search engine kernels 20, system 200 may comprise a single search engine kernel 20 in accordance with the present invention.

Result data stores 16 are functional elements for storing metadata associated with every item stored in the search engine kernel and the search persistent store. Data Identifiers, such as primary keys, found through the use of search engine kernels 20, are stored in results data stores 16 for subsequent provision to a user or requesting system. Search results comprise any returnable metadata known for each stream. Examples include title, URL, author, bit rate, and system. Tables 1 and 2 contain metadata for three different items (three unique filenames). The result key is a unique identifier for indexing into the metadata stored in the result store. The score is a numeric weighting computed for a specific query for the particular result key. This numeric weighting deals with term frequency, date relevancy, and other relevancy requirements to arrive at a single weighted score for each query for each row. Each result data store 16 may comprise any processor, code segment, storage device, database, or a combination thereof capable of storing search results and communicating the same with the search processor 14. Although system 200 is depicted in FIG. 2 as comprising a plurality of results data stores 16, system 200 may comprise a single results data store 16 in accordance with the present invention.

Search persistent store 22 is a functional element for storing the most recent view of the metadata in order to update the search engine kernels 20 and providing search metadata to the results data stores 16. Search persistent store 22 may comprise any processor, code segment, storage device, database, or a combination thereof capable of storing search results, providing search results to results data stores 16, and updating search engine kernels 20. The search persistent store 22 stores a full version of the metadata (both searchable and returnable) for every stream. The search engine kernel 20 contains only searchable metadata (which it gets from the search persistent store) while the results data store 16 retrieves returnable metadata. Both the search engine kernel 20 and the results data store 16 are updated by the search persistent store 22 distributing results to each corresponding system.

Promoter 24 is a functional element for updating the intermediate metadata stored in search persistent store 22 with the most recent version of metadata known for the given file/stream. This recent metadata is then provided to the search engine kernel 20 and the results data store 16 in a timely manner to provide a view of the metadata as it evolves. This mechanism provides a means of updating the metadata at a fast rate and a means to provide the metadata to the results data store 16 and search engine kernels 20 on a periodic timeline, as a processing load allows. The search persistent store/promoter is typically shared between monoliths at geographically similar locations. These mechanisms are the master source of metadata for updating the searchable view from the search engine kernels 20 and results data store 16. Thus providing a search system that is reliable and maintainable. Promotion takes updated metadata from the workflow system and updates the system as new data are discovered and current data are updated. The search engine kernels 20 and results data stores 16 grab updated content from the search persistent store 22 at a configurable interval to update their view of the metadata, such as shown in Tables 3 and 4.

In an alternative embodiment of the invention, promoter 24 functions with two subsystems: one for data-acquisition, and the other for moving data between databases and search clients. The first subsystem for data acquisition acquires metadata from sources connected on the Internet through data extractors well known in the art, as spiders. This collected metadata is then moved into search persistent store 22 by the promoter's first subsystem. The second subsystem called the "distributor" moves data (including some of the collected metadata) from the search persistent store 22 to clients as search engines, search engine kernels 20, results data stores 16, and other search persistent stores 22 that are geographically remote from the search persistent store 22.

TABLE 3

| File Name: | ALL_LOVE.WM | YELLOW_SUB.RM |
| --- | --- | --- |
| Title: | All You Need Is Love | Yellow Submarine |
| Artist: | Beatles | Beatles |
| Album: | Yellow Submarine | Yellow Submarine |
| Copyright Date: | 1969 | 1969 |
| Format: | Microsoft MediaPlayer | RealMedia |
| Playback Rate: | 250 KB | 30 KB |

TABLE 4

| File Name: | YELLOW_SUB.RM | YELLOW_MOV.RM |
| --- | --- | --- |
| Title: | Yellow Submarine | Yellow Submarine |
| Artist: | Beatles | |
| Album: | Yellow Submarine | |
| Actor: | | John Lennon |
| Genre: | | Musical |
| Copyright Date: | 1969 | 1969 |
| Format: | RealMedia | RealMedia |
| Playback Rate: | 30 KB | 250 KB |

Figure 3:
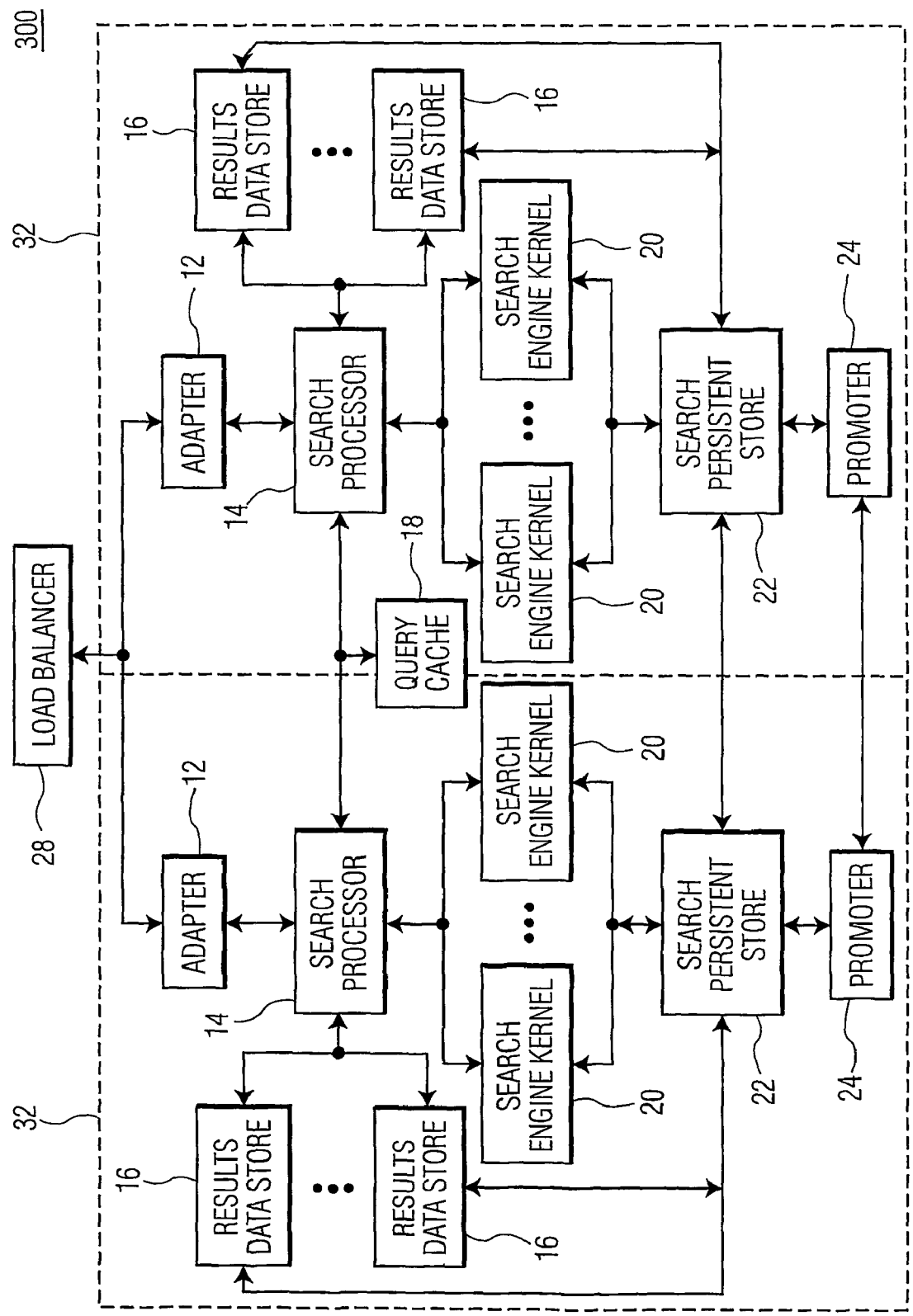
FIG. 3 is a functional block diagram of a search system comprising a plurality of search processors in accordance with the present invention.

FIG. 3 is a functional block diagram of a system 300 in accordance with the present invention comprising a plurality of search processors 14 and a load balancer 28. As can be seen in FIG. 3, system 300 comprises two subsystems 32 sharing a common query cache 18. Each subsystem 32 operates in a manner similar to system 200. In accordance with the demand being placed on system 300, load balancer 28 distributes the processing load approximately evenly between the subsystems. Furthermore, if one subsystem becomes inoperative, the load balancer 28 dynamically allocates the workflow for the inoperative subsystem to another subsystem. Although system 300 is depicted as having two subsystems 32, system 300 may comprise more than two subsystems 32 sharing a common query cache 18, to accommodate the demand being placed on the system 300. Optionally, system 300 has the two subsystems 32 sharing data between their respective search persistent stores 22 and promoters 24.

Figure 4:
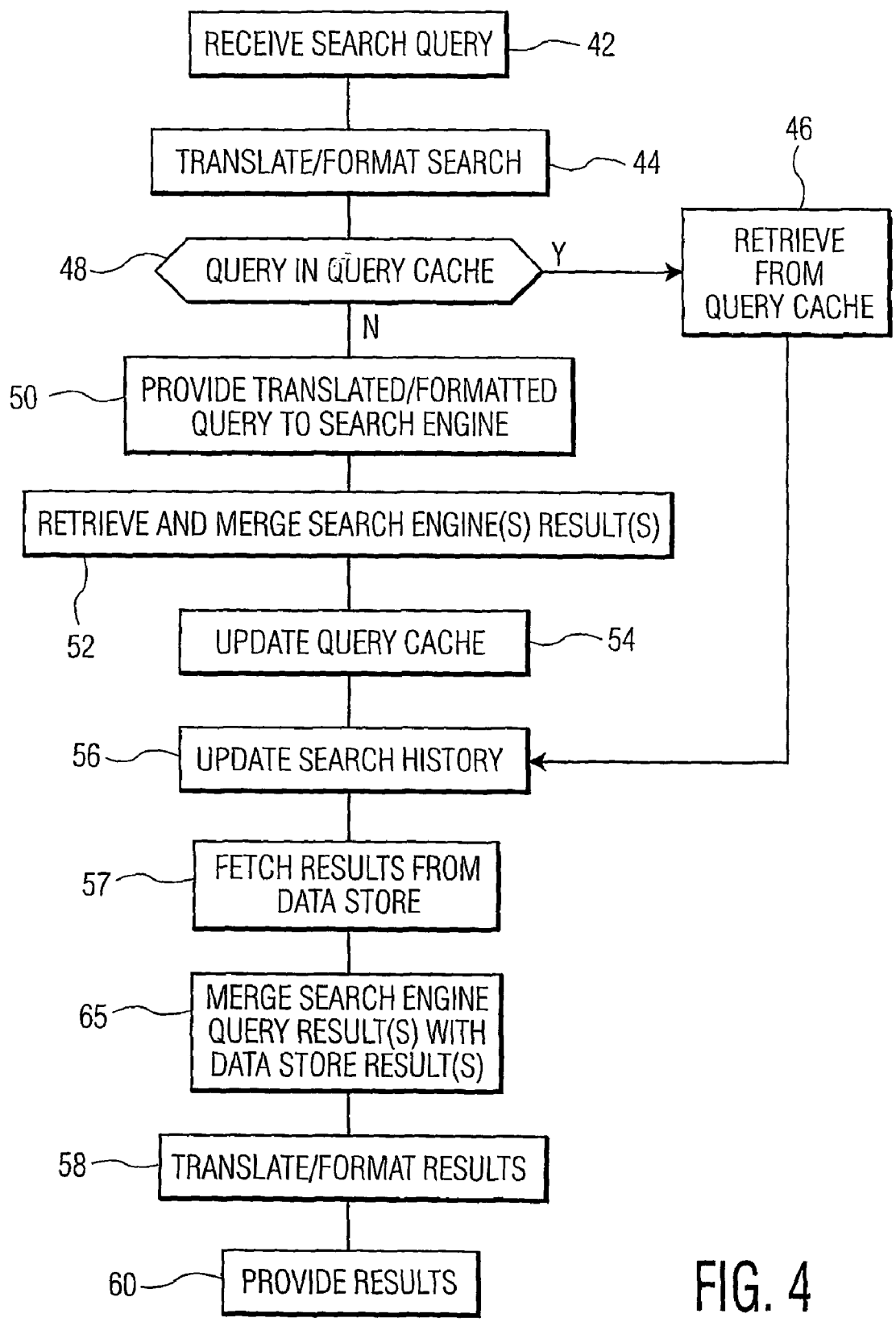
FIG. 4 is a flow diagram of a process for searching network-based content in accordance with the present invention.

FIG. 4 is a flow diagram of a process for searching network-based content in accordance with the present invention. Adapter 12, at step 42, receives the search query. The search query may be provided by a user, a requesting system, or by both query providers. The adapter 12 translates and/or formats the search query from a standard protocol (e.g., HTTP) to a system specific format (e.g., XML) at step 44. At step 48, the query cache 18 is searched for content relating to the search query. If content related to the search query is found in the query cache 18, the search results comprising that content are retrieved from the query cache 18 at step 46. Search engine kernels 20 are not searched if search results are obtained from the query cache 18. Thus, by not employing a search engine to search for content related to the search query, the system and process provide a very quick and efficient means for providing the search results to a user and/or requesting system. A file history is updated with the information pertaining to the search results retrieved from the query cache 18 at step 56. The information in this history file is used to update the query cache 18. Data for each key/score returned from the query cache 18 and/or search engine kernel 20 are combined with the returnable metadata from the results data store 16. The search results from the query cache 18 (keys and scores) and the returnable metadata (from the results data store 16 ), fetched at step 57, are merged at step 65 forming the merger of search engine query results with related data store results. The search results are then formatted to conform to the format in which the search query was originally provided, or a specifically requested format, at step 58. The formatted search results are then provided to a user and/or system through the results data store 16, search processor 14 and adapter 12, at step 60.

In various embodiments of the search system, the query cache 18 may be shared among co-located entities or monoliths, or be contained within one monolith, wherein each monolith comprises a query cache 18. This flexibility also applicable to the results data stores 16. That is the results data store 16 may be shared among co-located monoliths, or be contained within one monolith, wherein each monolith comprises a results data store 16.

If no content related to the search query is found in query cache 18, the formatted search query is provided to the search engine kernels 20, at step 50. The search engine kernels search databases comprising searchable metadata, which are inherent to each search engine. The query may also involve multiple search engines with their corresponding search engine kernel databases being the metadata searched against. These inherent databases may comprise the results of network searches conducted by agents, such as spiders and robots. Results are obtained by searching the search kernels 20 known subset, at step 52, yielding search engine result(s) that are merged, if the results come from multiple search engines. The search persistent store 22 is a central cache of all data coming from promotion that is used to update the search engine kernel 20 and the results data store 16. The search persistent store 22 may be co-located with the monoliths, or a geographically separated monolith may have its own search persistent store 22, which is synched via promotion. The query cache 18 is updated (for example, adding, changing, or deleting) with the information pertaining to the search results obtained from the search engine searches at step 54. Accordingly, if the current search query is provided to the system again, the system will retrieve search results from the query cache 18, rather than employing the time consuming search engine kernels 20 again. The history file is updated to with the information pertaining to the search results retrieved from the search engine kernels 20 at step 56. The information in this history file is used to update the query cache 18. The search results from the query cache 18 (keys and scores) and the returnable metadata (from the results data store 16), fetched at step 57, are merged at step 65 forming the merger of search engine query results with related data store results. The search results are then formatted to conform to the format in which the search query was originally provided, or a specifically requested format, at step 58. The search results obtained from the query cache 18 are then provided to a user and/or system through the results data store 16, search processor 14 and adapter 12, at step 60.

The translation and formatting performed at step 58 comprises formatting to extract search query specific content (for example streaming media files) from the intermediate search results stored in the search engine kernel 20, and formatting the search results to comply with the user provided or specified format by adapter 12.

It is noted that while some embodiments of system 200 operate with a single processor, the invention also operates efficiently with deployment over multiple monoliths shown as system 32 in FIG. 3 (each with their own search processor 14), which have search subsystems that may be shared. For example, two systems 32 are coupled together to form system 300. The number of search processors for system 300 is two, but in this alternative embodiment of the invention, there is a single search persistent store 22 and a single promoter 24 shared between each system 32. This doubling of subsystems may double the number of queries per minute the system 300 in FIG. 3 yielding returnable metadata, which has little impact on the metadata that may be searched. The invention also accommodates other permutations of scaleable deployment, for example, two search persistent stores 22 may be shared by three system 32, based upon geographic or bandwidth concerns. Additionally, multiple search engine kernels 20 within system 32 may be added to further increase the volume of databases that may be queried for a search (searchable metadata). In essence, the more systems 32 coupled together, and search engines kernels 20 added within each system 32; the more search queries, searchable metadata, and returnable metadata may be accommodated within the described invention.

A system and process for searching a network in accordance with the present invention provide robustness, separability, scalability, efficiency, and quickness. These characteristics are provided by a system comprising functional elements having defined application program interfaces (APIs) to each of the other functional elements. Thus, a change in version or vendor source of a functional element will have minimal impact on the system. Further, the system is dynamically reconfigurable to meet the processing and memory demands being place on the system. No one functional element need reside on a specific hardware device, thus providing reconfigurability comparable to a distributed architecture. Also, the system stores a predetermined amount of previous search results in a cache memory, such that search results for a current search are retrieved from that cache, thus avoiding the time consuming process of employing a search engine to search the network.

The present invention may be embodied in the form of computer-implemented processes and apparatus for practicing those processes. The present invention may also be embodied in the form of computer program code embodied in tangible media, such as floppy diskettes, read only memories (ROMs), CD-ROMs, hard drives, high density disk, or any other computer-readable storage medium, wherein, when the computer program code is loaded into and executed by a computer, the computer becomes an apparatus for practicing the invention. The present invention may also be embodied in the form of computer program code or an electronic signal, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

What is claimed is:

1. A method in a computer system for searching a network for network based content related to a search query, said computer system comprising a storage media and a processor, said method comprising the steps of:

receiving said search query;

formatting said search query;

searching a first cache database for network based content related to said formatted search query, said first cache database comprising previous search results;

if no network based content related to said formatted search query is found in said first cache database, providing said formatted search query to at least one search engine, wherein said formatted search query is in a format compatible with said at least one search engine;

receiving network based content related to said formatted search query from the search engine; and updating said first cache database with the received network based content from the search engine;

retrieving search results from said first cache database, wherein said search results are related to said formatted search query;

merging said search results from said first cache database with returnable metadata from a second database, said second database comprising returnable metadata related to said previous search results generated from searchable metadata, wherein said returnable metadata from said second database is related to said search results from said first cache database; and formatting said merged search results related to said search results from said first cache database and said returnable metadata from said second database to one of a user provided format and a requested format.

2. A method in accordance with claim 1, further comprising the step of updating a history file comprising search results.

3. A method in accordance with claim 1, further comprising the step of updating said first cache database to comprise most recent search results, wherein:

said most recent search results replace least recent search results; and search results residing in said first cache database for at least a predetermined amount of time are removed from said first cache database.

4. A method in accordance with claim 1, wherein said search query comprises at least one of multimedia and streaming media.

5. A system for searching a network for network based content related to a search query, said system comprising:
   a processor;
   an adapter for receiving and formatting said search query to a format compatible with at least one search engine;
   a first cache database comprising search results from previous search queries;
   a second database comprising returnable metadata related to said search results generated from searchable metadata; and
   a search engine for:
      coordinating searching of said first cache database;
      coordinating searching of said second database;
      coordinating searching of a third database;
      searching said first cache database for network based content related to said formatted search query;
      if no search results related to said formatted search query are found in said first cache database,
         searching said third database for search results related to said formatted search query; and
         updating said first cache database with said search results from searching said third database;
      retrieving search results from said first cache database, wherein said search results from said first cache database are related to said formatted search query;
      merging said search results from said first cache database with returnable metadata from said second database, wherein said returnable metadata from said second database is related to said search results from said first cache database; and
      providing said merged search results to said adapter, wherein said adapter formats said merged search results to one of a user provided format and a requested format.

6. A system in accordance with claim 5 further comprising a promoter for modifying data collected for use in a future search query.

7. A system in accordance with claim 6, wherein said modifying comprises at least one of: optimizing a format of said collected data for supporting said search engine, optimizing a selection of said collected data for supporting said search engine, and producing said collected data for conversion into a displayable format.

8. A system in accordance with claim 7, wherein said format of said collected data for supporting said search engine and said displayable format are different.

9. A system in accordance with claim 5, further comprising a search persistent database for storing data formatted for use by said search engine and said second database.

10. A system in accordance with claim 5, further comprising
    a plurality of adapters;
    a respective plurality of search engines;
    and a load balancer for approximately evenly distributing a processing load among each of said plurality of adapters and said respective search engines.

11. A system in accordance with claim 5, wherein communication between said adapter, said search engine, said first cache database and said second database is in accordance with a system specific application programming interface protocol.

12. A system in accordance with claim 5, wherein said search query comprises at least one of multimedia and streaming media.

13. A system in accordance with claim 5, wherein said third database comprises said searchable metadata.

14. A system in accordance with claim 5, wherein said first cache database comprises at least one of: a key generated from prior search query corresponding to said metadata in said second database, and a score generated from prior search query corresponding to said metadata in said second database.

15. A system in accordance with claim 5, wherein said search engine returns a subset of data from said merged search results corresponding to said formatted search query to said adapter for formatting, and said formatting is for generating a displayed page from a plurality of displayed pages corresponding to said merged search results corresponding to said formatted search query.

16. A computer-readable storage medium having embodied thereon a program for causing a processor to search a network for network based content related to a search query, said program comprising:
    means for causing said processor to receive said search query;
    means for causing said processor to format said search query;
    means for causing said processor to search a first cache database for network based content related to said formatted search query, said first cache database comprising previous search results;
    if no network based content related to said formatted search query is found in said first cache database,
       means for causing said processor to provide said formatted search query to at least one search engine, wherein said formatted search query is in a format compatible with said at least one search engine;
       means for causing said processor to receive network based content related to said formatted search query from the search engine; and
       means for causing said processor to update said first cache database with the received network based content from the search engine;
    means for causing said processor to retrieve search results from said first cache database, wherein said search results are related to said formatted search query;
    means for causing said processor to merge said search results from said first cache database with returnable metadata from a second database, said second database comprising returnable metadata related to said previous search results generated from searchable metadata, wherein said returnable metadata from said second database is related to said search results from said first cache database; and
    means for causing said processor to format said merged search results related to said search results from said first cache database and said returnable metadata from said second database to one of a user provided format and a requested format.

17. The computer-readable storage medium in accordance with claim 16, further comprising means for causing said processor to update a history file comprising search results.

18. The computer-readable storage medium in accordance with claim 16, further comprising means for causing said processor to update said first cache database to comprise most recent search results, wherein:

said most recent search results replace least recent search results; and search results residing in said first cache database for at least a predetermined amount of time are removed from said first cache database.

19. The computer-readable storage medium in accordance with claim 16, wherein said search query comprises at least one of multimedia and streaming media.

* * * * *